No. 888,322. PATENTED MAY 19, 1908.
M. H. ELLIOTT.
LUBRICATING DEVICE FOR AXLES.
APPLICATION FILED JAN. 21, 1908.
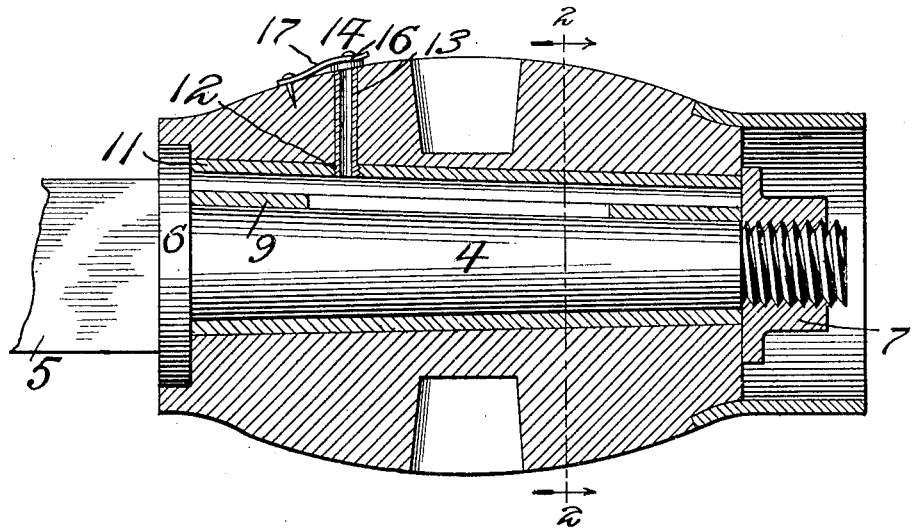
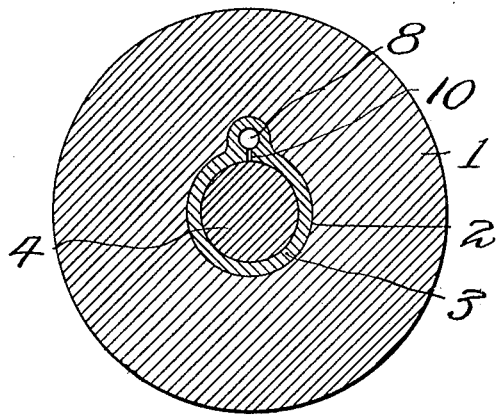
Witnesses
Hugh H. Ott
K. Allen
Inventor
Mathew Henry Elliott.
By Victor J. Evans
Attorney

UNITED STATES PATENT OFFICE.

MATHEW HENRY ELLIOTT, OF DIAL, ALABAMA.

LUBRICATING DEVICE FOR AXLES.   REISSUED

No. 888,322.   Specification of Letters Patent.   Patented May 19, 1908.

Application filed January 21, 1908. Serial No. 411,941.

*To all whom it may concern:*

Be it known that I, MATHEW HENRY ELLIOTT, a citizen of the United States, residing at Dial, in the county of Sumter and State of Alabama, have invented new and useful Improvements in Lubricating Devices for Axles, of which the following is a specification.

This invention relates to a self oiling device for vehicle axles, and the object of the invention is to provide a device of this character constructed upon the axle box of an ordinary vehicle hub, and provided with a chamber adapted for containing a lubricant and being provided with a slit or opening whereby the lubricant is imparted to the axle upon the revolution of the wheel to which the hub is attached.

To these ends the invention resides in the novel construction of axle boxes hereinafter fully described and claimed.

In the drawings, Figure 1 is a longitudinal sectional view of a vehicle hub provided with my improved oiling device, and Fig. 2 is a longitudinal sectional view taken upon the line 2—2 of Fig. 1, and looking in the direction of the arrows.

In the drawings the numeral 1 designates a vehicle hub of the ordinary construction, and provided with the usual longitudinal bore 2, for the reception of the axle box.

My improved axle boxing, comprises the usual hollow casting 3, cylindrical in cross section and adapted for the reception of the spindle 4 of an ordinary axle 5. The axle 5 is provided with the ordinary spindle flange 6, and is adapted to be retained upon the boxing and hub by the usual spindle nut 7. The axle boxing 2 is of a length equaling that of the spindle 4 between the flange 6 and the spindle nut 7. The boxing 3 is provided with a longitudinally extending oil chamber 8, preferably formed integral with the boxing and extending the full length thereof. The oil chamber 8 is a longitudinal bore, opened at both of its ends and adapted to abut against the spindle flange 6 at one end, and the head of the spindle nut 7 upon its opposite end, thus effectively closing both of the ends of the chamber. The wall of the boxing 9, formed between the bore of the boxing and the interior of the chamber is provided with a longitudinal slit 10, whereby the oil within the chamber is imparted to the spindle of the axle. The upper wall 11 of the chamber 8 is provided at a suitable point with a threaded aperture 12, and the hub 1 is provided with a passage alining with the opening 12 of the chamber 8. A tube 13 is provided within the passage formed within the hub 1 and is adapted to engage with the screw threaded opening 12 of the chamber 8 whereby lubricant is fed into the chamber 8. A suitable closure 14 is provided for the tube 13 upon the hub 1. The closure in the present instance comprises a washer 16 held normally in contact with the mouth of the tube 13 by a leaf spring 17 secured upon the hub 1.

With the construction of boxes for vehicle hubs just described, it will be seen that I have provided a simple, cheap and efficient device for automatically imparting oil to a vehicle spindle upon the revolution of the hub, and one in which the boxing is secured upon the hub in an immovable position, it of course being understood that a longitudinal passage is provided in the bore of the hub for the reception of the enlargement to the boxing formed by the lubricant chamber 8. The oil chamber of the boxing is rendered dust proof by contacting the flange and nut of the vehicle spindle and no special devices are required for closing the ends of the chamber.

Having thus fully described the invention what is claimed as new is:

1. The combination with a vehicle hub and a vehicle axle and nut therefor, of a boxing positioned within the bore of the hub and being provided with a lubricant chamber opened at both of its ends and adapted to have its ends closed by contacting the spindle flange and the head of the spindle nut of the axle, and being provided with a passage communicating with the vehicle spindle.

2. The combination with a vehicle hub and a vehicle axle therefor, and a nut for the spindle of the vehicle axle, of a boxing having a lubricant chamber opened at both of its ends and positioned within the vehicle hub, the ends of the chamber adapted to be closed by contacting the spindle flange of the axle and the face of the spindle nut, the lubricant chamber being provided with a slit communicating with the bore of the boxing whereby lubricant may be fed upon the axle spindle within the boxing, the upper wall of the lubricant chamber being provided with a tubing extending to the outer face of the vehicle hub, and a closure for the tubing.

In testimony whereof I affix my signature in presence of two witnesses.

MATHEW HENRY ELLIOTT.

Witnesses:
 FRED RUMLEY,
 W. A. ALTMAN.